July 4, 1950  R. A. NORBOM  2,513,737
SHIPPING CONTAINER
Filed Aug. 20, 1947  4 Sheets-Sheet 4
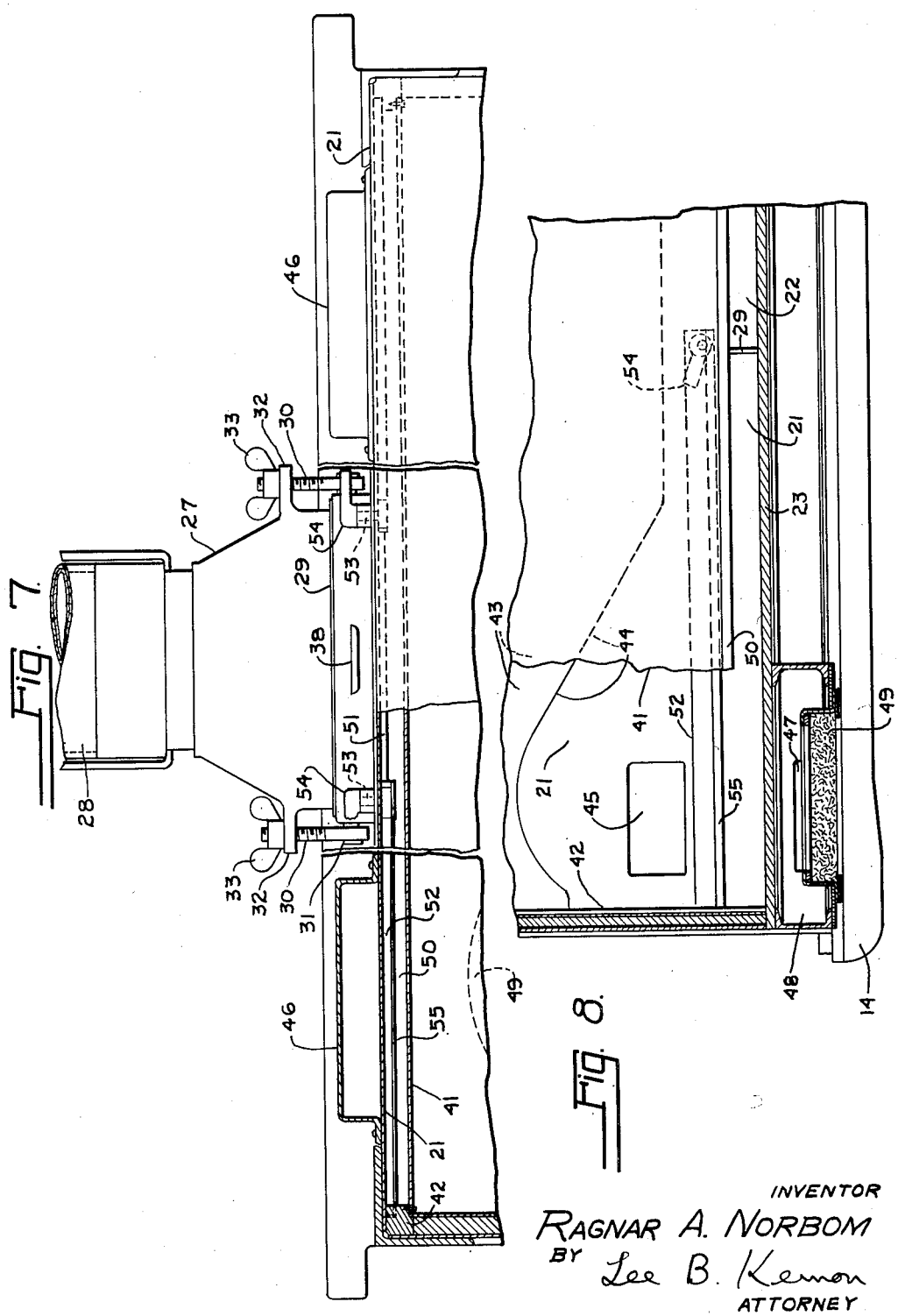
INVENTOR
RAGNAR A. NORBOM
BY Lee B. Kenon
ATTORNEY Patented July 4, 1950

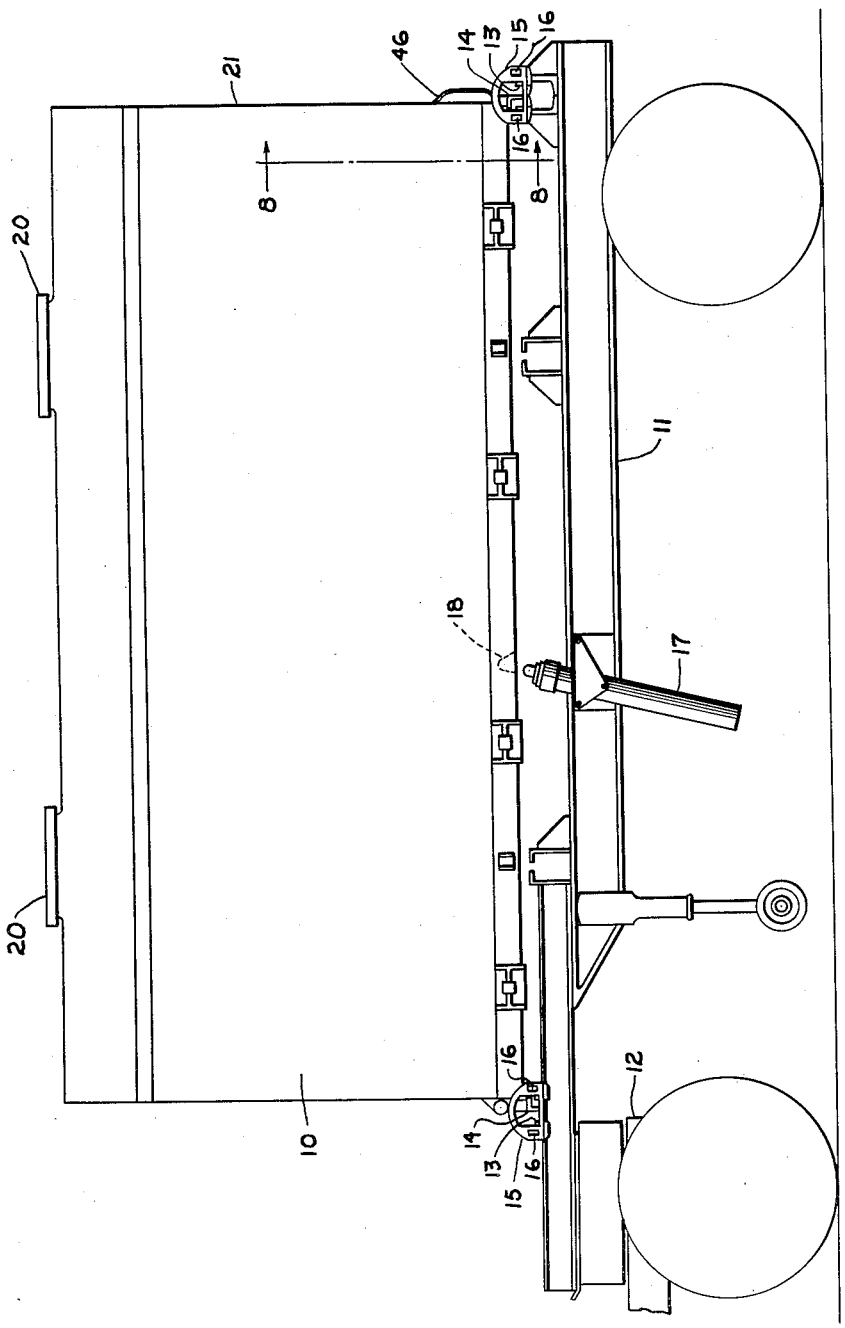

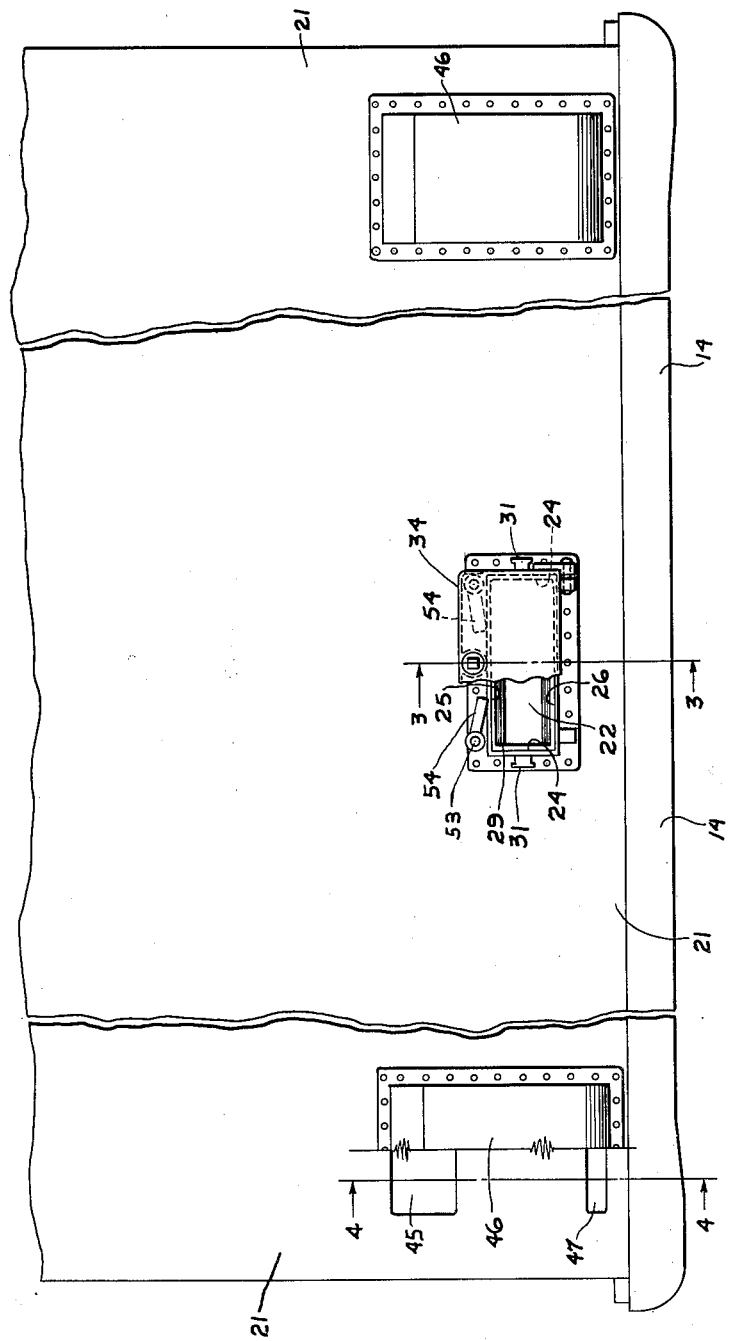

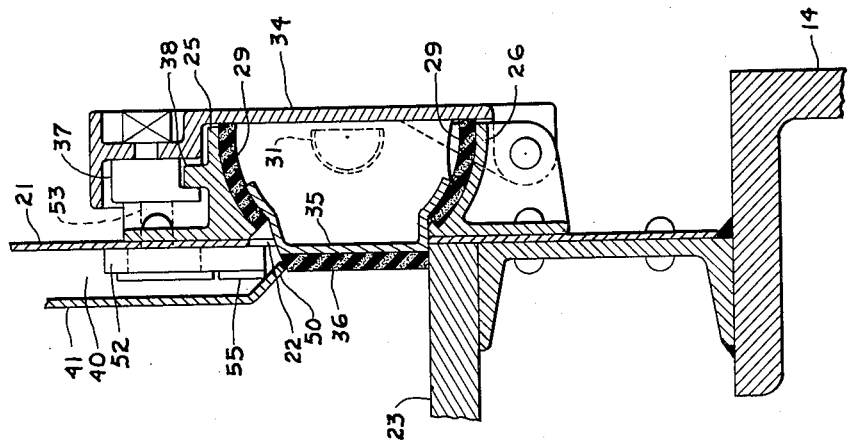

2,513,737

UNITED STATES PATENT OFFICE 2,513,737

SHIPPING CONTAINER

Ragnar A. Norbom, New York, N. Y., assignor to National Fitch Corporation, a corporation of Delaware Application August 20, 1947, Serial No. 769,570

10 Claims. (Cl. 214—83.28)

This invention relates to means for handling finely divided bulk material, such as cereal, grain, powdered chemicals and minerals, and more particularly flour or other pulverized or granulated food products. It is advantageous to transport such bulk material in relatively large containers capable of being sealed substantially airtight, and of such size that one or more may be transported upon a railway flat car or upon a highway vehicle, such as a truck or truck-trailer combination. The transportation of bulk material, particularly flour, in such large containers, instead of conventional small packages, bags, barrels or the like, not only saves much rehandling with the attendant breakage losses but also prevents contamination by moisture, vermin, and the like and results in a more economical and sanitary system of handling commodities such as flour. In addition such large containers may be used conveniently for storage purposes before ultimate use of the contents.

Although the employment of large containers for transporting flour, and the like, possess the advantages enumerated above, such containers may be used only if discharge or evacuation may be accomplished successfully. Arrangements for pneumatically discharging various kinds of finely divided bulk material are known, but because of the peculiar characteristics of flour they have not been used heretofore with any degree of success. One type of pneumatic discharge apparatus which will handle flour successfully is disclosed in my copending application Serial Number 647,060, filed February 12, 1946, issued as Patent Number 2,471,280, May 24, 1949. The present invention is an improvement thereon.

Accordingly, it is an object of this invention to provide a container, of the type described, with improved means for pneumatically discharging the entire contents thereof in a minimum of time.

Another object of the invention is to eliminate all inside protuberances or inclined walls in such a container, which interfere with gravity flow of the bulk material to the outlet.

Still another object of the invention is to reduce to a minimum the manual operations necessary to effect discharge of such a container.

A further object of the invention is to provide such a container with discharge apparatus that does not detract substantially from the cubic content of the container.

Other objects and advantages of the invention will be apparent from the following description and accompanying drawings in which:

Figure 1 is a side elevation of a semi-trailer highway vehicle having a container provided with my improved discharge means mounted thereon.

Figure 2 is a fragmentary elevation of the discharge end of the container shown in Figure 1 with portions cut away to show certain details more clearly.

Figure 3 is a fragmentary sectional view taken on line 3—3 of Figure 2, showing details of the discharge outlet and the closure therefor.

Figure 4 is a fragmentary sectional view taken on line 4—4 of Figure 2, showing details of the entraining air inlet system.

Figure 5 is a perspective view of the key for the discharge outlet cover lock.

Figure 6 is a view corresponding to Figure 3 but with the discharge outlet cover shown in open position and with the discharge nozzle attached.

Figure 7 is a top or plan view of the discharge end of the container with the discharge nozzle attached. Portions are cut away to show details more clearly.

Figure 8 is a fragmentary vertical sectional view taken on line 8—8 of Figure 1. Portions are cut away to show details more clearly.

Referring now to Figure 1 of the drawings, a demountable container 10 is shown loaded on a highway vehicle semi-trailer 11 in position to be transported. The semi-trailer is shown connected to the usual truck-tractor 12, only the rear portion of the latter being illustrated. Upwardly facing, transversely arranged, parallel channel guideways 13 on the semi-trailer receive the correspondingly mounted front and rear skid-rails 14 which are rigidly secured to the underframe of the container. This transverse supporting arrangement permits the container 10 to be loaded onto the semi-trailer from the side, which facilitates the transfer of the container from a railway car to the semi-trailer and vice versa. The container is to be locked securely to the semi-trailer 11, to prevent displacement in transit, by stirrups 15 which extend over the projecting ends of the skid rails 14 and engage fingers 16 mounted on the ends of the guideways 13. The contacting upper portions of the stirrups and the skid rails are correspondingly arcuate in shape, to permit turning of a skid rail within the stirrups when the container is tilted or elevated into discharging position as later described. This locking and tilting construction is shown in more detail in my above mentioned copending application (Serial No. 647,060) and forms no novel part of this invention.

Mounted on the semi-trailer 11 is a conventional hydraulic or pneumatic lifting mechanism 17, the upper end of which may be engaged in a recess or socket 18 in the under frame of the container and, after removal of the front stirrups 15 (one at either side of the semi-trailer), operated to tilt the container about the rear skid rail. This tilting of the container is necessary to effect a complete discharge of the contents thereof, as is hereinafter described.

The container 10 is of conventional shape, preferably metallic, and has one or more filling openings at the top provided with substantially airtight sealing closures 20. The discharge means for the container is located in the lower portion of and adjacent one end wall 21 thereof, as best shown in Figures 2, 3, and 6. The end wall 21 has a centrally disposed, rectangular discharge opening 22, the bottom edge of which is substantially flush with the floor 23 of the container. The outer side of the opening is provided with a collar-like flange having plane, parallel, vertically extending inner side walls 24 (Figure 2), and horizontally extending, parallel upper and lower inner walls 25 and 26, both arcuate in vertical section (shown in Figures 3 and 6), to provide a socket for pivotally receiving a suction hose nozzle 27 having a mouth formed with correspondingly shaped walls. The nozzle 27 is detachably secured to a flexible suction hose 28 connected to any suitable pneumatic conveyor apparatus. A gasket 29 of rubber, or other suitable material, is secured in the socket for sealing engagement with the coextensive walls of the nozzle mouth to prevent in-leakage of air when suction discharge is being effected, as will be described. The nozzle 27 is detachably secured for vertical pivotal movement, as best shown in Figures 6 and 7, by means of eye bolts 30, the eyes of which engage oppositely directed, horizontally extending flanged lugs 31 on the container. The threaded stems of the bolts 30 pass through apertured ears 32 on the nozzle and are held in place by means of wing nuts 33. This pivotal arrangement permits the nozzle to remain in substantially horizontal position when the container is tilted to discharging position, as shown by the dot-dash lines in Figure 6.

To close the discharge opening 22, when the nozzle is not attached thereto, a hinged cover 34 is provided to sealingly engage the projecting periphery of the gasket 29. The cover 34 has an inwardly extending plug 35 having side walls shaped to conform to the socket and provided with a sealing strip 36 of rubber, or other suitable material, on the inner face thereof for a purpose later described. The cover 34 is locked in place by means of a rotatable detent 37 which engages a corresponding projection 38 on the container and has a square, or other suitably shaped, outer end to receive an operating key 39. The cover is unlocked and dropped downwardly into the position indicated by the dotted lines in Figure 6 when discharge is to be effected.

To permit suction discharge of the contents of the container, the container is provided with air inlet or venting means, both to prevent the formation of a substantial vacuum in the container and to agitate and direct the flow of the loose bulk material to the discharge outlet, without packing or sticking. This means is an important feature of the invention and contributes in large part to the successful evacuation or discharge of such commodities as flour.

Spaced inwardly from the end wall 21 to form an air passageway 40 therebetween (Figures 3 and 4) is a parallel wall 41 extending across the container and depending to the level of the upper edge of the discharge opening 22. The wall 41 may be detachably secured in place by screws or other fastening means engaging the corner posts 42 of the container. The upper portion of the space between the end wall 21 and the parallel wall 41 is filled with suitable material 43, such as wood, the lower edge 44 of which is shaped to decrease the vertical height of the air passageway 40 toward the center line of the container as best shown in Figure 8. Air is admitted to the passageway through openings 45 in the end wall 21 which communicate with exterior ducts 46. The ducts 46, in turn, communicate, through openings 47 in the end wall 21, with compartments 48 located beneath the floor 23 of the container. The compartments 48 receive outside air through filters 49 (Figures 4 and 8).

The lower edge of the wall 41 has a depending flange 50, inclined outwardly toward the end wall 21 to form an outlet 51 therebetween in the form of a slot. The lower edge of the flange 50 depends somewhat below the upper edge of the discharge opening 22 to enlarge the effective width of the slot outlet 51 across the opening. Located in the bottom of the air passageway 40 are two slot closure bars 52, one on each side of the discharge opening 22. The outer ends of the bars 52 are let into recesses in the corner posts 42, while the inner or adjacent ends are mounted eccentrically on short shafts or studs 53 which pass through the end wall 21 and are provided with operating handles 54. Rotation of the studs 53 by means of the handles 54 serves to raise and lower the inner ends of the bars 52, while the outer ends thereof remain in lowered position. From this construction, it will be seen that the bars 52 are slideably mounted flush against the inner side of the end wall 21 and that in lowered position they rest on the upper side of the flange 50, thus closing the slot outlet 51 on both sides of the discharge opening 22. When in closed position, the bars 52 prevent the loose bulk material in the container from entering and clogging the air passageway 40, and further provide an effective seal against contamination of the lading by entrance of any foreign matter through the air inlet system. A sealing strip 55, of rubber or the like, may be provided on the lower edge or, as shown, on the inner face of the bars 52 to contact the upper side of the flange 50 and provide a more effective seal therebetween. At this point, it is pointed out that when the cover 34 is closed, the sealing strip 36 on the inner face of the plug 35 engages the lower edge of the flange 50 to close the slot outlet 51 across the discharge opening 22. It also will be noted that the inner side of the upper portion of the cover 34 is recessed so that when the cover is closed, the closure bar operating handles 54 are snugly received therein and locked in closed position (as shown in Figures 2 and 3) to prevent accidental raising of the bars while the container is in transit. It also will be seen that since the outer ends of the bars 52 remain lowered at all times, when the inner ends thereof are in raised position, as shown in Figure 8, the effective width of the slot outlet 51 tapers from central points, i. e. adjacent the side edges of the discharge opening 22, in opposite directions toward the ends of the slot.

Having thus described a structural embodiment of the invention, the operation is as follows: With the nozzle 27 removed, the cover 34 locked in closed position, and the bars 52 lowered to close the slot outlet 51, the container is filled with loose bulk material in any conventional manner and the filling opening closures 20 replaced. The container may then be transported by rail or automotive highway vehicle to its destination. Usually the final leg of the trip involves a short haul by a truck or truck-trailer combination as previously described. Upon arrival at the discharge destination, the front stirrups 15 are removed and the lifting mechanism 17, or any other suitable hoisting apparatus, is operated to tilt the container into discharge position. The tilting of the container is necessary in order to provide gravity aid in moving the loose bulk material toward the discharge outlet 22. While in some respects loose bulk material has fluid characteristics, it does not flow as readily as a true fluid and also is somewhat subject to packing and sticking. Therefore, a rather steep inclination should be given to the container floor in order to enable the material to flow readily to the discharge outlet.

During the tilting operation, the operator unlocks the cover 34 with the key 39, opens the cover sufficient to insert the nozzle and attaches the hose nozzle 27 in the socket, holding it pivotally in place by the wing nuts 33. The pneumatic suction of the hose 28 may then be made effective, and, since the plug 35 has been removed, the central portion of the slot outlet 51 is uncovered and a limited supply of material entraining air is available. This supply is not sufficient, however to prevent the formation of a substantial vacuum in the container and, furthermore, with only this portion of the slot open, there is no means to effect removal of the material from the lower corners of the container. Accordingly, the operator operates the handles 54 to raise the slot closure bars 52. Outside filtered air may then flow into the container throughout the entire length of the slot 51 to aerate and agitate the material at both sides of the discharge opening 22. This air flow also will serve to remove material from the lower portion of the now inclined end wall 21, thereby assisting the downward flow of material therealong. The air escaping along the slot sets up a current directed toward the discharge opening which carries the material from the lower far corners toward the discharge opening. It will be noted that the effective width of the slot opening is greater near the discharge opening 22 in order to provide a large volume of air to entrain the material more readily at the point of discharge. The height of the passageway 40 decreases near the center to impart increased velocity to the air escaping from the central portion of the slot. This high velocity air escaping from the central portion of the slot, i. e. above the discharge opening, impinges directly on the material flowing by gravity through the opening and violently agitates it, thus preventing packing and consequent tunnelling at this point. The mixture of air and loose bulk material then is drawn through the nozzle into the suction hose for discharge at any desired location, e. g., into a storage bin. The air filters 49 serve to clean the incoming air and thus prevent contamination of the loose bulk material with dust, moisture, and the like.

After the discharge operation has been completed, the nozzle is detached, the bars lowered, the cover replaced and locked, and the container lowered to level position for transportation elsewhere.

It will be seen that there has been provided discharge means for a container which does not require interior slope sheets or other capacity reducing means for effective operation, and in which no interior projections or angular walls exist to interfere with gravity flow of the bulk material. Furthermore, the absence of complicated mechanical devices and the presence of readily accessible, non-tortuous passageways for easy cleaning will be noted. The discharge apparatus occupies a minimum of space and provides the container with a maximum of cubic content.

Although a specific embodiment of the invention has been illustrated and described, it will be realized that various modifications and changes readily will be apparent to one skilled in the art. Accordingly, the spirit and scope of the invention are defined in the following claims.

I claim:

1. In a container for transporting finely divided bulk material having upright side and end walls, suction discharge means comprising: a suction discharge conduit opening to the container interior through a central lower portion of an upright wall thereof, an inlet passageway for material-entraining out-side air having an outlet opening to the interior of the container in the form of a downwardly directed slot extending substantially the length of and parallel to said wall immediately above and overhanging the inner end of said conduit.

2. The structure set forth in claim 1, wherein the lower end of the air inlet passageway is partially closed by a flange, downwardly and outwardly inclined toward the said upright wall, to provide the slot outlet therebetween; and including elongated movable slot closure members operable in said passageway to bear against said flange and said wall to close said slot.

3. The structure set forth in claim 1 wherein the effective width of the slot outlet tapers toward the ends of the wall from points adjacent each side of the inner end of the discharge conduit.

4. The structure set forth in claim 1 wherein elongated closure members are provided in said passageway to close said slot outlet on either side of the inner end of the central discharge conduit, said closure members being provided with elevating means for the ends thereof adjacent said conduit, whereby when said ends are elevated, the effective opening of said slot outlet diminishes in both directions from said discharge conduit.

5. A container for transporting finely divided bulk material having upright side and end walls, one of said walls having a discharge opening in a central lower portion thereof, said container being supported to be tiltable bodily about substantially the bottom edge of said one wall, a suction discharge conduit adapted to be secured in said opening for pivotal movement in a vertical plane, and an inlet passageway for conducting material-entraining outside air to the interior of the container and having a downwardly facing outlet slot extending along substantially the length of and parallel to said wall immediately above and overhanging said discharge opening.

6. A container for transporting finely divided bulk material having a suction discharge opening in a central lower portion of an end wall thereof, a second wall spaced inwardly of said end wall to form an air inlet passageway therebetween, said passageway being in communication with the exterior of said container, said second wall extending downwardly to a point adjacent the upper edge of said discharge opening and being provided with a downwardly extending flange inclined toward said end wall to form a narrow slot air-outlet for said passageway therebetween, closure means for portions of said slot including elongated members in said passageway, one on each side of said discharge outlet, resting normally on said flange, and means for raising the inner ends of said members whereby the effective opening of said slot outlet diminishes in both directions from said discharge outlet.

7. The structure set forth in claim 6 wherein the air inlet passageway communicates with the exterior of the container through a passageway formed between the end wall and a third wall spaced outwardly thereof, said end wall having openings therein above and below the floor of the container opposite said third wall to place said air inlet passageway in communication with the space below said floor.

8. A container for transporting finely divided bulk material having a suction discharge opening in a central lower portion of an end wall thereof, an entraining air inlet passageway having an outlet opening to the container interior in the form of a downwardly directed slot extending along substantially the length of said end wall and overhanging said discharge opening, said passageway being in communication with the exterior of said container at points adjacent the opposite ends of said passageway and the effective cross sectional area of said passageway diminishing from said opposite ends to points adjacent the opposite sides of said discharge opening.

9. A container for transporting finely divided bulk material having a discharge opening in a lower portion of an end wall thereof, an entraining air inlet passageway having an outlet opening to the container interior, means for regulating the effective opening of said outlet having an operating handle disposed exteriorly of said container adjacent said discharge opening, and an exteriorly disposed, pivotally mounted closure member for said discharge opening adapted to be locked in closed position, said closure member having recesses adapted to receive and lock said operating handle against movement when said closure member is in closed position.

10. A container for transporting finely divided bulk material having a discharge opening in a lower portion of an end wall thereof, an entraining air inlet passageway in communication with the exterior of said container and having an outlet opening to the container interior in the form of a downwardly directed slot extending along substantially the length of said end wall and overhanging said discharge opening, closure means operable from the container exterior for the portions of said slot on opposite sides of said discharge opening, and an exteriorly disposed, pivotally mounted closure member for said discharge opening adapted to be locked in closed position, said closure member having an inwardly extending portion adapted to close that portion of said slot between said closure means when said member is in closed position.

RAGNAR A. NORBOM.

REFERENCES CITED

The following references are of record in the file of this patent:

UNITED STATES PATENTS

| Number | Name | Date |
| --- | --- | --- |
| 1,029,273 | Butler | June 11, 1912 |
| 1,465,665 | Grindle | Aug. 21, 1923 |
| 2,116,603 | Holly | May 10, 1938 |
| 2,147,300 | Kennedy | Feb. 14, 1939 |

FOREIGN PATENTS

| Number | Country | Date |
| --- | --- | --- |
| 30,908 | France | July 6, 1926 |